July 3, 1962

J. E. MILES 3,041,956

ROOF TYPE AERATING DEVICE

Filed Sept. 30, 1959

INVENTOR
JOHN E. MILES

By *Lowell & Henderson*

ATTORNEYS

July 3, 1962  J. E. MILES  3,041,956
ROOF TYPE AERATING DEVICE
Filed Sept. 30, 1959  2 Sheets-Sheet 2

INVENTOR
JOHN E. MILES
BY
Lowell & Henderson
ATTORNEYS

United States Patent Office 3,041,956
Patented July 3, 1962

1

3,041,956
ROOF TYPE AERATING DEVICE
John E. Miles, Mason City, Iowa, assignor to Aer-Vac Incorporated, Mason City, Iowa, a corporation of Iowa
Filed Sept. 30, 1959, Ser. No. 843,572
3 Claims. (Cl. 98—55)

This invention relates generally to grain storage bin aerating devices and in particular to a roof-attachable means for supporting the aerating device on an inclined roof for vertical suspension within the bin.

A usual type of device for aerating grain within a storage bin includes a wind turbine or spinner from the lower end of which is supported an aerating or ventilating tube; the wind turbine being projected upwardly from the roof of the bin; and the aerating tube being extended downwardly from the roof and into the grain. With circular bins having conical roofs, the aerating device is usually suspended through a central opening through the roof peak for support in a vertical position. However, in storage bins of rectangular shape or the like having reversely inclined roof sections, appreciable difficulty has theretofore been encountered in vertically supporting the aerating device from the roof section due to the variation in the pitch or angle of inclination of the roof section. As a result, the wind turbines and aerating tubes, for the same bin, are inclined at various angles from the vertical so as to impair the operating efficiency of the aerating device along with detracting from the outer appearance of the bin.

It is an object of this invention, therefore, to provide an improved aerating device for a grain storage bin.

A further object of this invention is to provide a roof adaptor or jack for a grain bin aerating device, that is connectable between the wind turbine and aerating tube and cooperable with a frame unit supported on the bin roof such that the device is adjustably movable to a vertically extended position for different roof inclinations.

Another object of this invention is to provide a roof adaptor for a grain bin aerating device which is of a compact and economical construction and readily and quickly assembled with the aerating device to support the same in a vertically extended position on bin roofs inclined up to about fifty degrees from a horizontal plane.

Further objects, features and advantages of this invention will become apparent from the following description when taken in connection with the accompanying drawings, in which.

Figure 1:
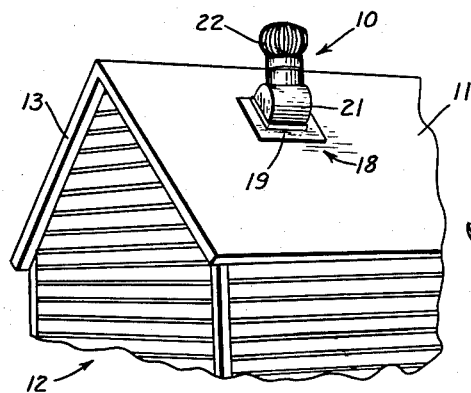
FIG. 1 is a fragmentary perspective view of a grain storage bin showing a preferred form of the aerating device of this invention installed therewith.

Referring now to the drawings, the aerating device of this invention is generally indicated by reference numeral 10, and is shown attached to an inclined roof portion 11 of a grain bin 12, the bin having reversely inclined roof portions 11 and 13.

Figure 4:
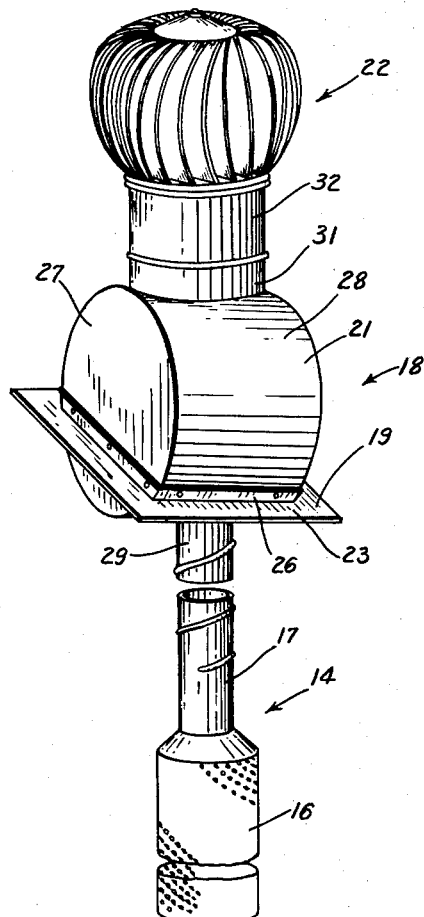
FIG. 4 is an enlarged partially exploded view in perpective of the aerating device of FIG. 1.

The aerating device 10 is comprised of three principal elements, an aerating member 14 (FIG. 4) including a breather section 16 and a draft tube 17, a roof adaptor unit 18 including a frame member 19 and a hollow housing 21, and a spinner head or wind turbine 22.

Figure 3:
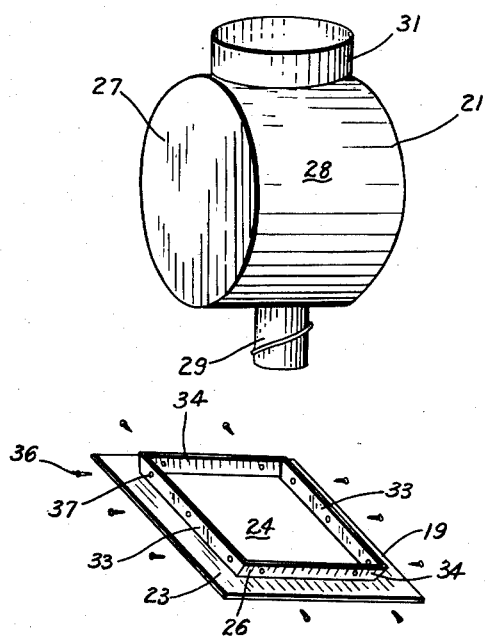
FIG. 3 is an enlarged exploded view in perspective of the roof adaptor unit of FIG. 2.
Figure 5:
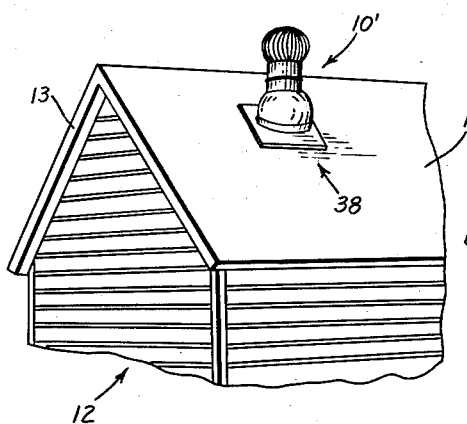
FIG. 5 is an fragmentary perspective view of a grain storage bin showing a modified form of the aerating device of this invention installed therewith.

The roof adaptor unit 18 of this invention provides a means readily adapted to a roof of any conventional pitch for adjustably supporting the wind turbine 22 and the aerating member 14 in vertical axial alignment as will be pointed out. The frame member 19 (FIG. 3) has a rectangular, flat base section 23 adapted to be secured in any conventional manner to the roof portion 11. A rectangular opening 24 is formed in the base section 23 for registration with a like opening (not shown) in the roof portion 11. The opening 24 is defined by an upstanding peripheral wall 26.

The hollow housing 21 provides an air circulating chamber and is of a drum-like exterior having flat, circular end walls 27 (only one showing) spaced by a continuous curved side wall 28. Circular air inlet and outlet openings (not shown) of varied diameters are coaxially formed in the lower and upper portions, respectively, of the housing side wall 28 for air connection purposes. The lower air inlet is provided with a short tube 29 depending from the housing 21 for connection, as by threaded rotation, with the upper draft tube end of the aerating member 14. The upper air outlet is provided with a circular upstanding collar 31 secured to the housing 21 and of a larger diameter than the tube 29, and which collar 31 is adapted for connection to the lower circular portion 32 of the wind turbine 22.

Figure 2:
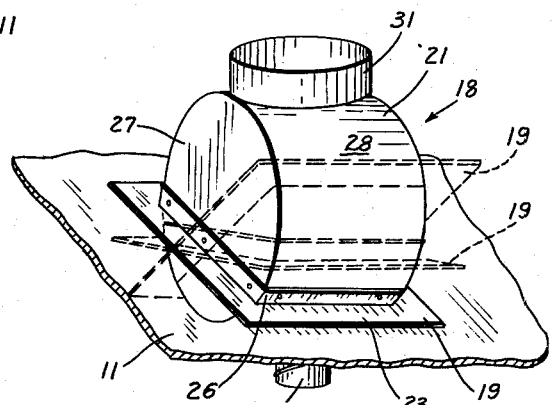
FIG. 2 is an enlarged fragmentary perspective view of the roof adaptor unit of the aerating device of FIG. 1.

As the spacing between the end walls 27 of the housing 21 is slightly less than the spacing between one pair of opposed portions 33, 33 (FIG. 3) of the base section wall 26, and as the spacing between the other pair of opposed portions 34, 34 of the wall 26 is slightly less than the diameter of the curved side wall 28 of the housing 21, it may be readily observed that the housing is receivable within the frame member 19 (FIG. 2). To provide a seating effect, the wall portions 34, 34 (FIG. 3) may be inclined downwardly toward each other at an angle similar to the respective tangential angles at the points of contact between the wall portions 34, 34 and the housing circular wall 28.

The housing 21 and the frame member 19 are thus pivotally movable, each about a respective horizontal axis, relative to each other. Therefore, whether the frame member 19 is placed in accordance with the pitch of the roof portion 11 in the full line position of FIG. 2, or in the several alternate dotted line positions illustrated therein, again in accordance with varied roof pitches, the housing 21 is tiltable relative to the stationary frame member 19. By this arrangement, the housing 21 is adjustably movable to a position wherein the axis through the upper collar 31 and the lower tube 29 (FIG. 4) is vertical for proper vertical alignment of the wind turbine 22 and the aerating member 14, respectively. When the adjustment has been completed, screws 36 (FIG. 3) or other fastening devices are insertable through holes 37 provided therefor in the wall portions 33, 33 of the frame member 19 for securing the member to the housing 21.

In the modified roof adaptor 38 for the aerating device 10 of FIGS. 5–8, with like parts being indicated by like reference numerals as to the adaptor unit 18 of FIGS. 1–4, the frame member 39 is provided with a circular opening 41 and a circular, upstanding flange 42. The flange is inclined inwardly to provide a seat for the housing 43, which in the modified form is ball-like in shape. To provide a swivel adjustment of the housing 43 relative to the frame member 39, the peripheral flange 42 being inclined at an angle similar to the tangential angle at the full line circle of contact between the flange 42 and the housing 43.

Figure 6:
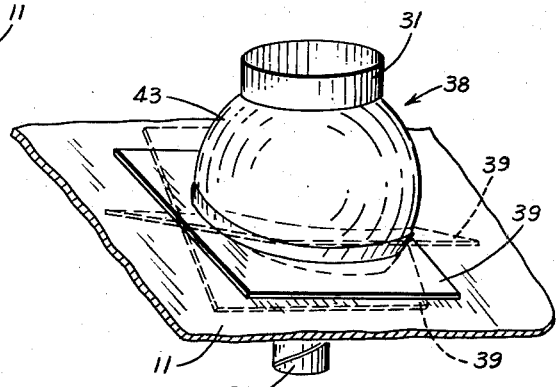
FIG. 6 is an enlarged, fragmentary perspective view of the roof adaptor unit of the aerating device of FIG. 5.
Figure 8:
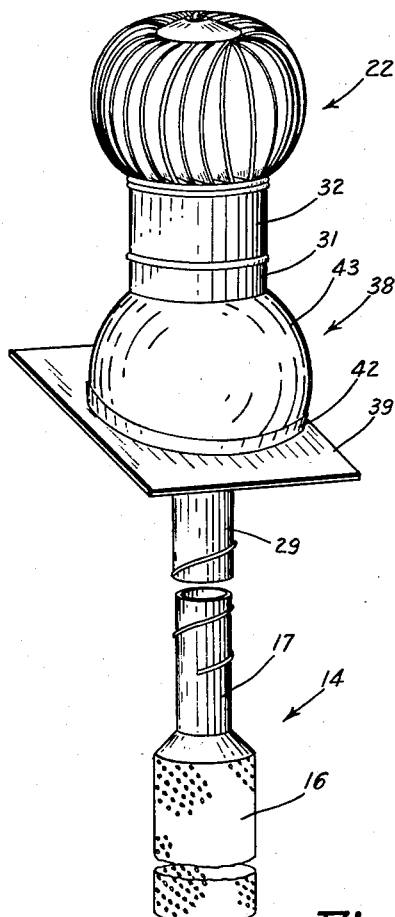
FIG. 8 is an enlarged, partially exploded view in perspective of the modified aerating device of FIG. 5.
Figure 7:
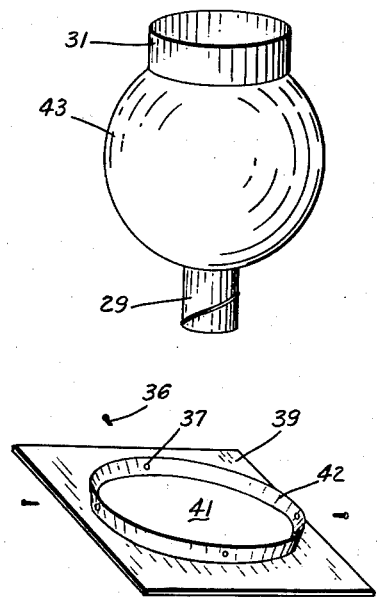
FIG. 7 is an enlarged exploded view in perspective of the roof adaptor unit of FIG. 6.

Thus, after the frame member 39 has been secured to the roof portion 11 (FIG. 6), the housing 42 is readily seated and tiltably adjusted in the frame member 39 for proper vertical alignment of the wind turbine 22 and the aerating member 14 (FIG. 8). As illustrated in FIG. 6, this vertical positioning of the housing 43 is easily obtainable irrespective of the inclination or slant of the frame member 39 (shown in several positions), as determined by the pitch of the roof portion 11.

Although a preferred embodiment and one modified form of the invention have been disclosed herein, various changes and other alternate constructions may occur which are within the scope of the invention as defined in the appended claims.

I claim:

1. A grain aerating apparatus for storage bins having a flat inclined roof portion provided with an opening to receive said apparatus, said apparatus comprising, in combination, a wind turbine positioned above said inclined roof portion, an aerating member suspended downwardly beneath said roof portion, and a roof adapter means for supporting said turbine and aerating member in vertical axial alignment on said inclined roof portion, said roof adapter means including a hollow housing forming an air circulating chamber, said housing having contoured wall portions which support an upper air connection at the upper portion of said hollow housing and a lower air connection, coaxially aligned therewith, at the lower portion of said housing, said upper air connection being of a greater diameter than said lower air connection, first means securing said upper air connection to said wind turbine, second means securing said lower air connection to said aerating member, a frame unit having a flat base section adapted to be secured to the top side of said roof portion, said base section having an opening therein, the peripheral edges of said opening being complementarily contoured to receive and seat the contoured wall portions of said hollow housing within said opening, the contoured portions of said hollow housing permitting tilting movement of said housing relative to the frame unit while said housing is maintained contiguous with said contoured opening, whereby said housing is movable to an adjusted position wherein the axis of said air connections are in a substantially vertical plane, and means to secure said housing in said adjusted position to said base section.

2. The grain aerating apparatus of claim 1 wherein said hollow housing is substantially cylindrical in configuration and includes a pair of flat, circular, end walls and a continuously curved side wall connected between said end walls.

3. The grain aerating apparatus of claim 1 wherein said hollow housing is of a round, ball-like configuration.

References Cited in the file of this patent

UNITED STATES PATENTS

| | | |
|---|---|---|
| 1,703,670 | Hoeft | Feb. 26, 1929 |
| 1,704,942 | Hopson | Mar. 12, 1929 |
| 2,797,632 | Hook | July 2, 1957 |
| 2,856,838 | Mack | Oct. 21, 1958 |